May 14, 1946.　　　O. E. SEIFFERT　　　2,400,169
DRILL CHUCK
Filed June 1, 1944　　　3 Sheets-Sheet 1
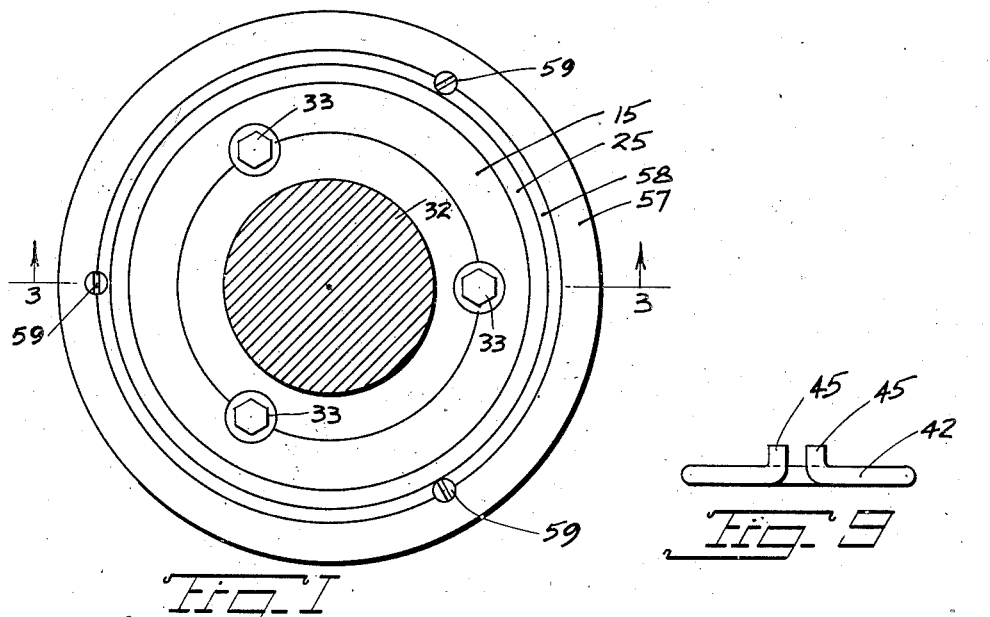
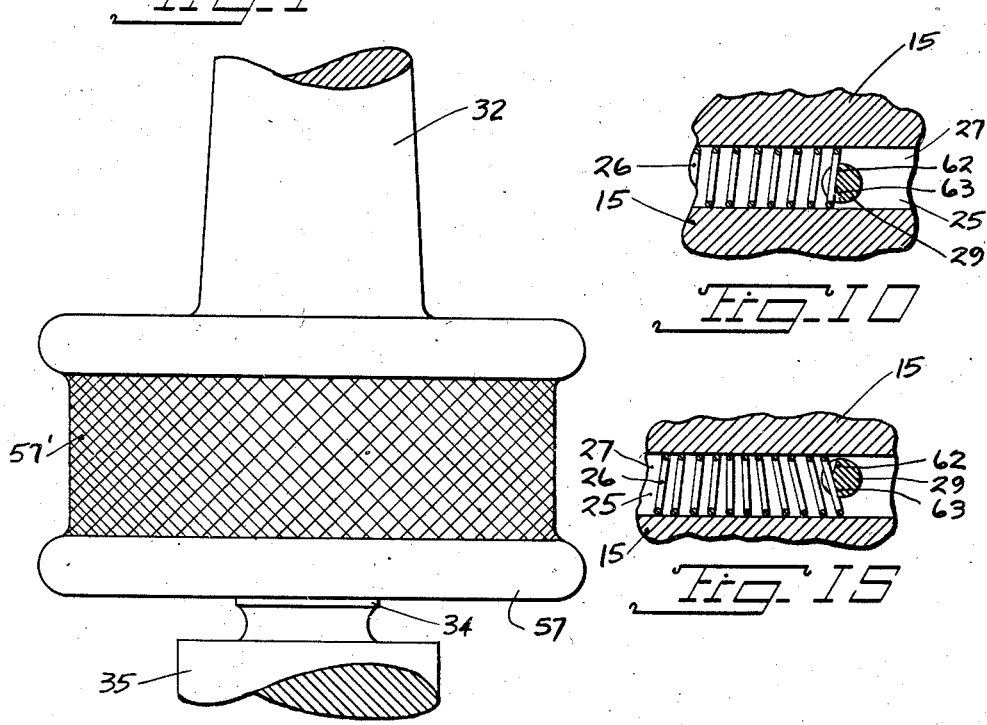
INVENTOR.
OTTO E. SEIFFERT
BY
ATTORNEY

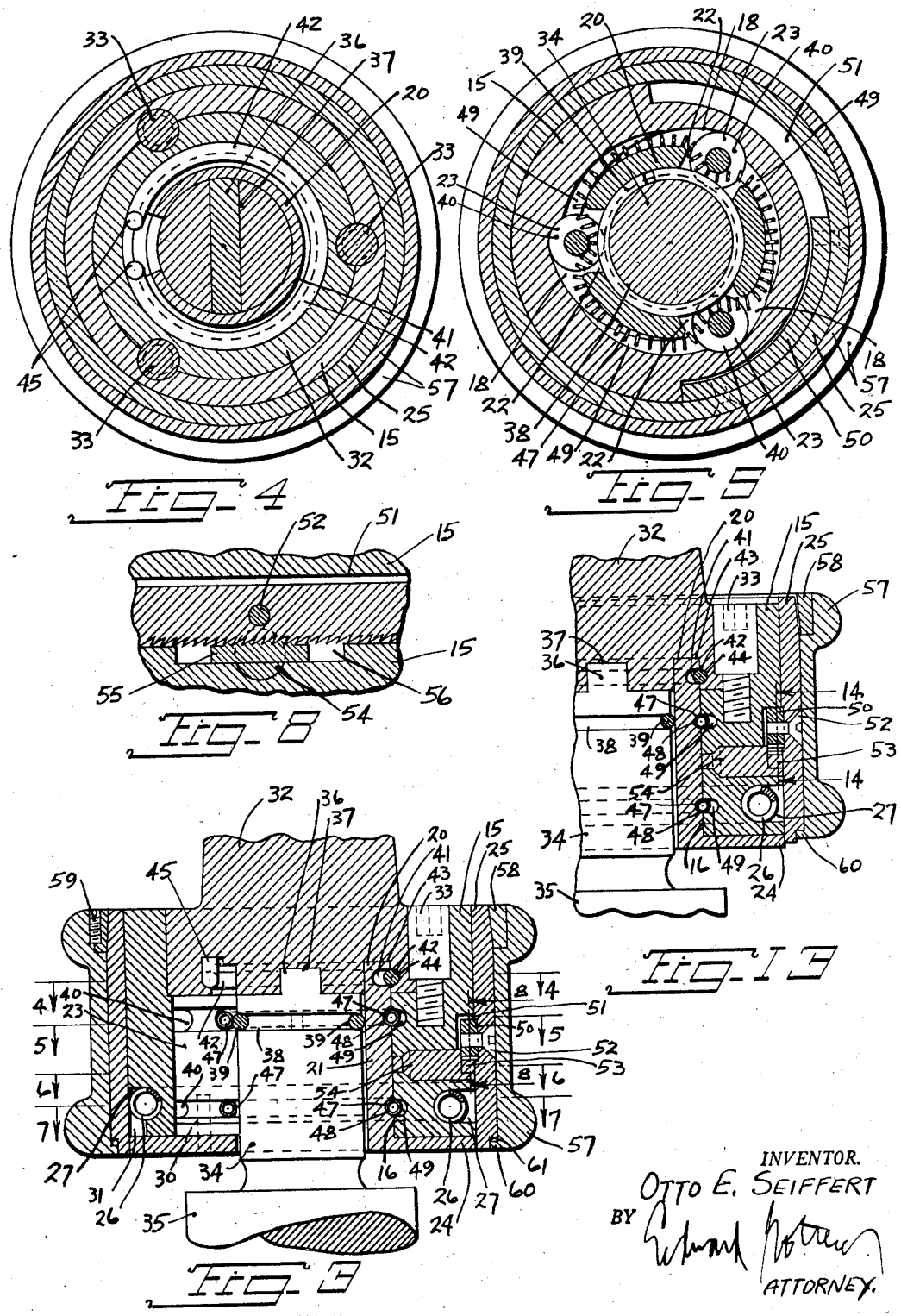

May 14, 1946.  O. E. SEIFFERT  2,400,169
DRILL CHUCK
Filed June 1, 1944   3 Sheets-Sheet 3
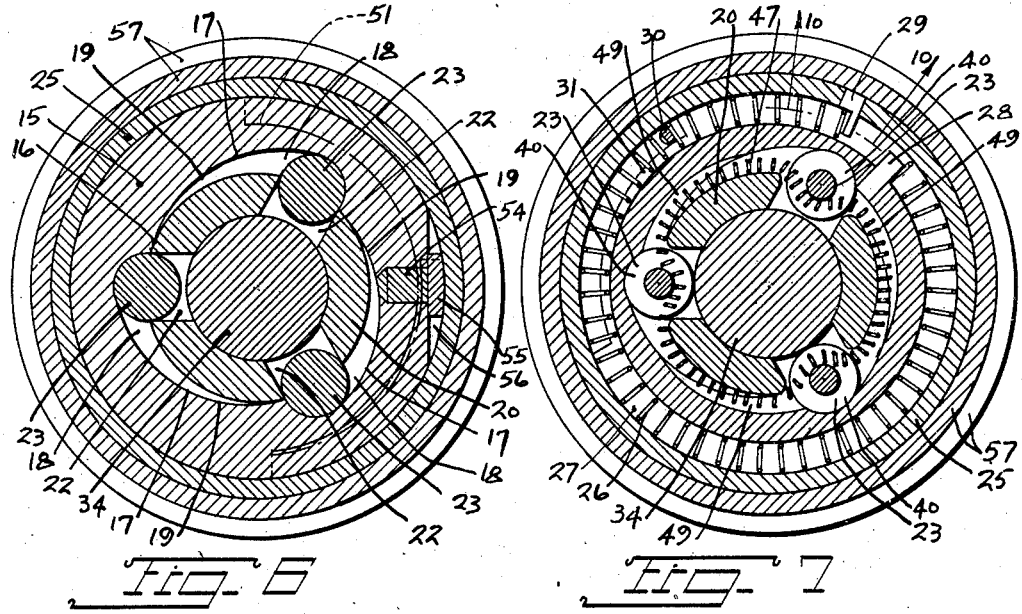
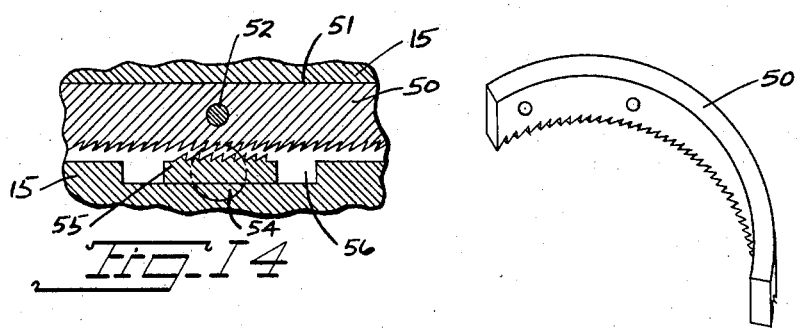
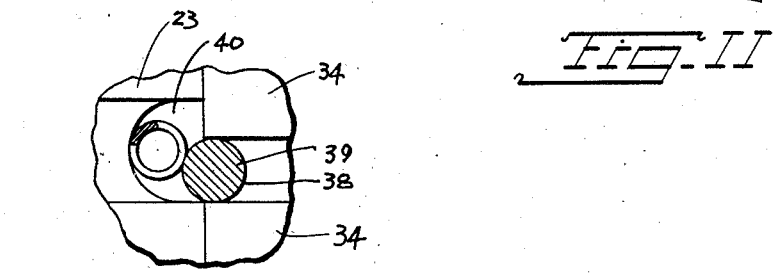
INVENTOR.
Otto E. Seiffert
BY
ATTORNEY.

Patented May 14, 1946

2,400,169

UNITED STATES PATENT OFFICE 2,400,169

DRILL CHUCK

Otto E. Seiffert, Baltimore, Md.

Application June 1, 1944, Serial No. 538,293

7 Claims. (Cl. 279—72)

This invention relates to new and useful improvements in drill chucks, and has more particular reference to improvements over my drill chuck covered by United States Letters Patent No. 1,597,731.

An important feature of the new and improved drill chuck resides in the fact that it may be used for tapping as well as drilling. It can do tapping because an arrangement is provided whereby it may be turned in either direction. For this purpose a tongue is proposed on the drive shank or the driven shank, engaging a complementary groove on one or the other of said shanks. The new and improved drill chuck not only can operate in both directions, but is capable of securely clamping the tool shank while operating in either direction.

Another improved feature resides in providing the clamping rollers with grooves accommodating endless springs arranged to urge the clamping rollers into open positions and arranged so as not to interfere with the load carrying ability of the rollers.

Another feature resides in providing the roller cage with grooves for accommodating the endless springs which open the clamping rollers.

Another feature resides in providing the driven shank, that is, the shank of a tool engaged in the drill chuck, with a groove housing a spring ring for engaging the grooves of the clamping rollers and holding the driven shank in position at times when the clamping rollers are engaged from the driven shank. It is proposed to arrange said grooves quite deep in the driven shank so that the center of the wire on the spring ring is inside the circumference of the driven shank when contracted so that the weight of the tool cannot possibly displace said spring ring. It is proposed to so arrange the spring ring of the driven shank that it may be removed without using any appliances.

The invention also proposes providing the roller cage with a groove, and a spring ring for resiliently connecting same with the drive shank when assembling the chuck. It is proposed to make the groove in the roller cage deeper than semi-circular so that the spring ring may engage therein and within the bore of the drive shank. It is proposed to provide this spring ring with laterally turned ends for assisting in assembling the chuck.

Another feature resides in the provision of several screws for connecting the chuck body with the drive shank, which act as keys for transmitting the driving motion.

Still another feature resides in the provision of a tapered friction drive band on the external hand sleeve for cooperation with the drive ring of the chuck to drive the drive ring when the hand sleeve is in a down position, and to be free of the drive ring when the hand sleeve is slightly elevated.

The invention proposes to provide certain of the parts of the chuck with certain tolerances which permits the hand sleeve to be moved a small distance upwards or downwards providing for the action referred to in the previous paragraph.

The invention also proposes to provide the clutch body with a ratchet pin cooperative with a ratchet segment mounted on the drive ring. A certain tolerance is provided between the clutch body and the ratchet segment, permitting the drive ring to be moved upwards a slight distance for disengaging its teeth from the teeth of the ratchet pin when it is desired to open up the chuck.

The invention also proposes to provide the ratchet pin with laterally projecting shoulders to keep it from turning.

It is proposed to provide the drive ring with a groove for receiving a small portion of the side of the ratchet segment for securely holding the latter.

It is contemplated to taper the drive pin which projects from the drive ring and which is engaged by the main spring which urges the drive ring and chuck body into an initial or starting position, so that the main drive spring is capable of holding the drive ring firmly in a raised or a lowered position representing the opened or closed position of the chuck hand sleeve.

The invention also proposes to provide large tools, with reduced shanks for adapting them to engage into the roller cage of the chuck.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a plan view of a drill chuck constructed in accordance with this invention.

Fig. 2 is a side elevational view of the drill chuck shown in Fig. 1.

Fig. 3 is a vertical sectional view taken on the line 3—3 of Fig. 1.

Fig. 4 is a horizontal sectional view taken on the line 4—4 of Fig. 3.

Fig. 5 is a horizontal sectional view taken on the line 5—5 of Fig. 3.

Fig. 6 is a horizontal sectional view taken on the line 6—6 of Fig. 3.

Fig. 7 is a horizontal sectional view taken on the line 7—7 of Fig. 3.

Fig. 8 is a fragmentary vertical sectional view taken on the line 8—8 of Fig. 3.

Fig. 9 is a side elevational view of the spring ring of the driven shank.

Fig. 10 is a fragmentary sectional view taken on the line 10—10 of Fig. 7.

Fig. 11 is a perspective view of the ratchet segment.

Fig. 12 is an enlarged detailed view of a portion of Fig. 3.

Fig. 13 is a fragmentary sectional view similar to Fig. 3 but illustrating the clutch in an open position.

Fig. 14 is a fragmentary vertical sectional view taken on the line 14—14 of Fig. 13.

Fig. 15 is a sectional view similar to Fig. 10 but illustrating the position of the parts when the chuck is open, that is, in the position illustrated in Fig. 13.

The new and improved drill chuck includes a cylindrical body 15 having an axial cylindrical bore 16 with a series of gripping roller cam surfaces 17 having deep ends 18 and shallow ends 19. A roller cage 20 is mounted within said cylindrical body 15. The roller cage 20 has a tubular portion 21 formed with a plurality of radially extending slots 22 for gripping rollers 23. The roller cage 20 also is provided with a bottom external flange 24. The cylindrical body rests on said flange 24.

A drive ring 25 is turnably mounted on and about the cylindrical body 15. An expansion spring 26 is housed within a circumferential groove 27 formed in the cylindrical body 15 and has its ends connected between said body 15 and the drive ring 25 for normally urging said body 15 and drive ring 25 into a relative initial or starting position. More specifically, the expansion spring 26 acts between a drive pin 28 mounted on the body 15 and projecting into the groove 27, and a second drive pin 29 which is mounted on the drive ring 25 and projects into the groove 27.

A pin 30 is mounted on the flange 24 of the roller cage 20 and extends through an opening 31 formed in the body 15 and communicates with the groove 27. This pin 30 engages an intermediate point of the spring 26 and is for the purpose of turning the roller cage 20 for moving the rollers 23 from the deep ends 18 of the cam surfaces 17 towards said shallow ends 19 when said drive ring 25 is turned counter-clockwise as viewed in Fig. 7.

A drive shank 32 extends across the bore of and is connected with said cylindrical body 15. More particularly, the drive shank 32 is connected with the cylindrical body 15 by several screws 33. A driven shank 34, or a tool, engages into said roller cage 20 and is for the purpose of being gripped by the rollers 23. This driven shank 34 may be in the nature of a reduced shoulder of a tool 35, such as a drilling or tapping tool. A tongue 36 is formed on one of said shanks, namely the driven shank 34, and engages a complementary groove 37 formed in the other one of said shanks, namely the drive shank 32. The driven shank 34 is formed with a peripheral groove 38 for a spring ring 39. This groove 38 is sufficiently deep so that the center of the wire of said spring ring 39 is within the circumference of the driven shank 34, and so that the spring ring 39 may be engaged inside of the bore of the roller cage 20. The spring ring 39 is a split ring and normally tends to contract into the base of said groove 38. The rollers 23 are formed with grooves 40. When the rollers 23 engage the shank 34 the spring ring 39 engages the bottom shoulders of certain of said grooves 40 which tend to jam the spring ring 39 against the base of the groove 38 and since the rollers 23 are supported in the roller cage 20, the driven shank 34 will be supported by the spring ring 39 and rollers 23.

The tubular portion 21 of the roller cage 20 is formed with an external peripheral groove 41 engaged by a spring ring 42. This groove 41 is sufficiently deep so that the spring ring 42 may engage completely in it so that the tubular portion 21 of the roller cage 20 may be engaged into the bore 16 of the cylindrical body 15. The drive shank 32 is formed with a recess 43 into which the upper end of the tubular portion 21 of the roller cage 20 engages. This recess 43 is formed with an internal annular groove 44 into which the ring 42 may expand for removably connecting the roller cage 20 with the drive shank 32. The spring 42 is provided with offset ends 45 by which it may be manually compressed to force it into the groove 41 of the tubular portion 21 of said roller cage 20. This facilitates the assembling of the tubular portion 21 into the bore 16 of the cylindrical body 15.

Endless springs 47 engage said grooves 40 of the rollers 23 and engage grooves 48 formed in the external face of the tubular portion 21 of the roller cage 20. The endless springs 47 also engage grooves 49 formed in the bore 16 of the cylindrical body 15. These grooves 49 are sufficiently deep to house the springs 47 when the tubular portion 21 of the roller cage 20 is engaged into the bore 16 of the cylindrical body 15. The endless springs 47 serve to urge the rollers 23 into open positions, that is, free of the driven shank 34 and against the cam surfaces 17 of the cylindrical body 15.

A ratchet segment 50 is set into a very shallow recess formed upon the inner face of the drive ring 25 and projects into a larger recess 51 formed in the outer face of the cylindrical body 15. The ratchet segment 50 is secured into the drive ring 25 by several fastening screws 52. In the normal position of the drive ring 25 there is a small clearance or space between the top face of the ratchet segment 50 and the top face of the groove 51, see particularly Fig. 3. In the normal position of the drive ring 25, the teeth of the ratchet segment 50 engage the teeth of a ratchet pin 53 which is mounted on the cylindrical body 15. This ratchet pin 53 has a cylindrical shank 54 engaging into a complementary hole in the cylindrical body 15 and is also provided with a transverse head 55 forming shoulders which engage the bottom face of a recess 56 formed in the cylindrical body 15 which prevents the ratchet pin from turning. The ratchet pin 53 and the teeth of the ratchet segment 50 are undercut, see particularly Fig. 8, so that when these teeth are engaged with each other, the ratchet segment 50 will be held down and lock.

A hand sleeve 57 with a knurled outer face 57' is mounted around the drive ring 25. This hand sleeve 57 has a small top tapered friction drive band 58 cooperative with a complementary tapered surface formed on the adjacent face of the drive ring 25. The tapered friction drive band 58 is securely connected with the hand sleeve 57 by a plurality of set screws 59 engaged through the adjacent portions of these parts and acting in the nature of keys. The hand sleeve 57 has a small bottom flange 60 engaging a complementary recess formed in the bottom portion of the drive ring 25. This recess is sufficiently high so that normally there is a tolerance or space 61 above the flange 60 which permits the drive sleeve 57 to be raised up a small amount to disengage the friction drive band 58 from the tapered adjacent drive portion of the drive ring 25.

The drive pin 29 is formed with an upwardly directed beveled portion 62 and a downwardly directed beveled portion 63. The end of the spring 26 normally engages the upwardly directed bevel 62 for holding the drive ring 25 in its down position, as illustrated in Figs. 3 and 10. However, when the drive ring 25 is moved to its up position, as illustrated in Figs. 13 and 15, then the spring 26 engages the bevel 63, see Fig. 15, holding the drive ring 25 in its raised position.

The operation of the chuck is as follows:

The driven shank 34 may be locked in the position shown in Fig. 3 by turning the hand sleeve 57 counter-clockwise in relation to Figs. 5–7. When the hand sleeve 57 is turned counter-clockwise, the hand sleeve 57 through the tapered friction drive band 58 will turn the drive ring 25 counter-clockwise, which will move the ratchet segment 50 counter-clockwise so that its teeth skip over the teeth of the ratchet pin 53 which prevents clockwise turning of these parts. When the drive ring 25 is turned counter-clockwise, the drive pin 29 will compress the adjacent end of the spring 26, driving the pin 30 counter-clockwise. Since the pin 30 is connected with the flange 24 of the roller cage 20, the roller cage 20 will turn counter-clockwise. This forces the rollers 23 from the deep ends 18 of the cam surface 17 towards the shallow ends 19. The rollers 23 are thus forced radially inwards and grip the driven shank 34. Furthermore, the spring ring 39 will engage the bottom shoulder of the top grooves 40 of the rollers 23. The body 15, during this time, is held non-rotative because it is keyed to the drive shank 32 which is mounted in the drill or drill press. The drive shank 32 may now be turned in one direction or the other to transmit corresponding rotations to the driven shank 34. The reason why it may be turned in both directions is because of the inter-engaging tongue 36 and groove 37. The rollers 23 grip the driven shank 34 sufficiently hard to carry a good load. The spring ring 39 in conjunction with the top grooves 40 of rollers 23 aid in carrying said load.

The driven shank 34 may be released by moving the hand sleeve 57 upwards. This causes the tapered friction drive band 58 to be moved free from the driven ring 25, and because of the flange 60 the drive ring 25 will be lifted, as illustrated in Fig. 13, so that the teeth of the ratchet segment 50 will disengage the teeth of the ratchet pin 53. Immediately the spring 26 will cause the drive pin 29 to turn the drive ring 25 back to its initial or starting position. This motion causes the spring 26 to move the pin 30 back to its initial position. The roller cage 20 is thus turned clockwise, and the rollers 23 will be moved from the shallow ends 19 to the deep ends 18 of the cam surfaces 17. The endless springs 47 will force the rollers 23 radially outwards, freeing the driven shank 34.

The drive shank 32 which is a tapered shank, may be removed and replaced with a different tapered shank whenever this is desirable. To do this the screws 33 are first removed and then the shank 32 is pulled upwards relative to the roller cage 20 so that the spring ring 42 is forced into the recess 41. This frees the shank 32. The upward projecting ends 45 of the spring ring 42 may be manually pressed together to force the spring ring 42 into the groove 41 and then the roller cage 20 may be moved downwards relative to the cylindrical body 15. It may be moved downwards a short distance so that the spring ring 42 is within the top portion of the bore 16 of the cylindrical body 15. Now a new drive shank or the drive shank 32 may be re-engaged in position on the cylindrical body 15. The roller cage 20 is then moved upwards so that the spring ring 42 snaps into the groove 44 of the drive shank 32. When the roller cage 20 is moved downwards relative to the cylindrical body 15, the springs 47 will be forced completely into the deep grooves 49 of the cylindrical body 15.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a drill chuck having a cylindrical body provided with an axial bore formed with a series of gripping roller cam surfaces and a roller cage turnably mounted in said body, gripping rollers mounted in said cage for engaging said cam surfaces and having circumferential grooves, and springs for normally urging said rollers outwards and extending endlessly around said roller cage and engaging in said grooves.

2. In a drill chuck having a cylindrical body provided with an axial bore formed with a series of gripping roller cam surfaces and a roller cage turnably mounted in said body, gripping rollers mounted in said cage for engaging said cam surfaces and having circumferential grooves, and springs for normally urging said rollers outwards extending endlessly around said roller cage and engaging in said grooves, and said roller cage being formed with external circumferential grooves along which said springs extend.

3. In a drill chuck having a cylindrical body provided with an axial bore formed with a series of gripping roller cam surfaces and a roller cage turnably mounted in said body, gripping rollers mounted in said cage for engaging said cam surfaces and having circumferential grooves, and springs for normally urging said rollers outwards extending endlessly around said roller cage and engaging in said grooves, and said roller cage being formed with external circumferential grooves along which said springs extend, and said cylindrical body having internal grooves complementary to said external circumferential grooves along which said springs extend.

4. In a drill chuck having a cylindrical body provided with an axial bore formed with a series of gripping roller cam surfaces and a roller cage turnably mounted in said body, gripping rollers mounted in said cage for engaging said cam surfaces and having circumferential grooves, and springs for normally urging said rollers outwards and extending endlessly around said roller cage and engaging in said grooves, a driven shank engaging in said roller cage and formed with a circumferential groove, and a spring ring mounted in and projecting from said groove of said driven shank for resting upon the bottom shoulders of certain of said grooves in said gripping rollers when said gripping rollers are in their gripping positions.

5. In a drill chuck having a cylindrical body provided with an axial bore formed with a series of gripping roller cam surfaces and a roller cage turnably mounted in said body, gripping rollers mounted in said cage for engaging said cam surfaces and having circumferential grooves, and springs for normally urging said rollers outwards and extending endlessly around said roller cage and engaging in said grooves, a driven shank engaging in said roller cage and formed with a circumferential groove, and a spring ring mounted in and projecting from said groove of said driven shank for resting upon the bottom shoulders of certain of said grooves in said gripping rollers when said gripping rollers are in their gripping positions, a drive shank mounted on said cylindrical body and interengageable tongues and grooves on said driven shank and drive shank engaging each other when said driven shank is being supported by said spring ring.

6. In a drill chuck having a cylindrical body provided with an axial bore formed with a series of gripping roller cam surfaces and a roller cage turnably mounted in said body, gripping rollers mounted in said cage for engaging said cam surfaces and having circumferential grooves, and springs for normally urging said rollers outwards and extending endlessly around said roller cage and engaging in said grooves, a driven shank engaging in said roller cage and formed with a circumferential groove, and a spring ring mounted in and projecting from said groove of said driven shank for resting upon the bottom shoulders of certain of said grooves in said gripping rollers when said gripping rollers are in their gripping positions, a drive shank mounted on said cylindrical body and interengageable tongues and grooves on said driven shank and drive shank engaging each other when said driven shank is being supported by said spring ring, and said drive shank having an annular groove into which the end of said roller cage engages, and a spring ring mounted in a circumferential groove in one face of said groove in said drive shank and engaging into a complementary groove around said roller cage when said roller cage is in a position in which its gripping rollers have their grooves supporting the spring ring which supports said driven shank.

7. In a drill chuck having a drive ring and a hand sleeve surrounding said drive ring, a tapered friction drive ring mounted on said hand sleeve and engaging a complementary taper on said drive ring, and a flange on said hand sleeve engaging a recess in said drive ring providing a slight tolerance for lifting said hand sleeve to disengage said tapered parts.

OTTO E. SEIFFERT.